Dec. 22, 1925. 1,566,665
A. H. FROST ET AL
METHOD OF PRODUCING RUBBER ARTICLES
Original Filed Nov. 13, 1922 4 Sheets-Sheet 1

INVENTOR
A. H. Frost and
C. F. Fenlason Jr.
BY
Denison Thompson.
ATTORNEYS

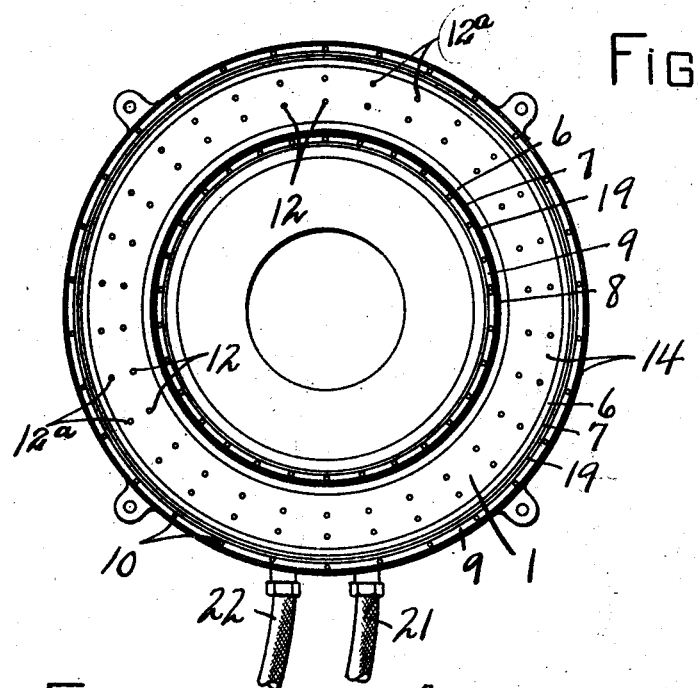
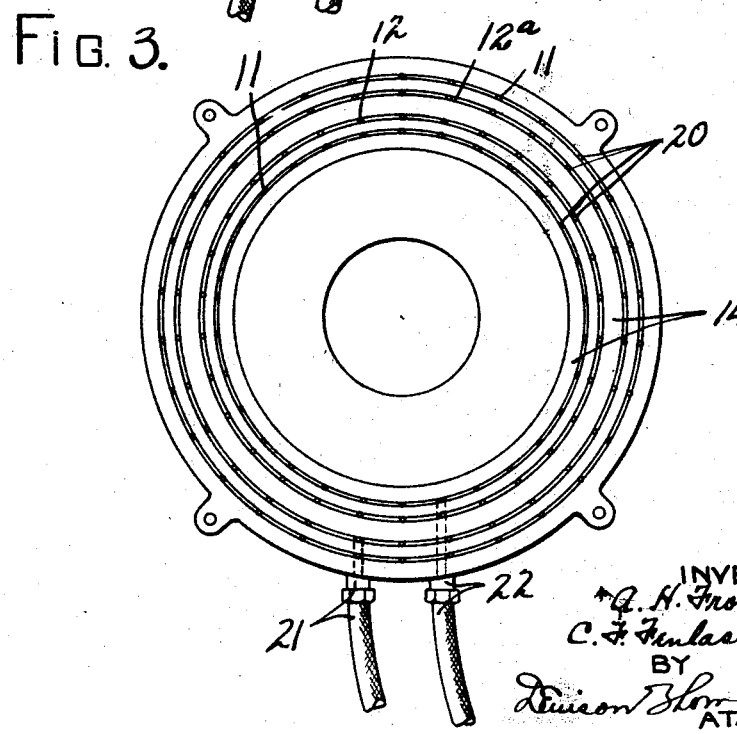

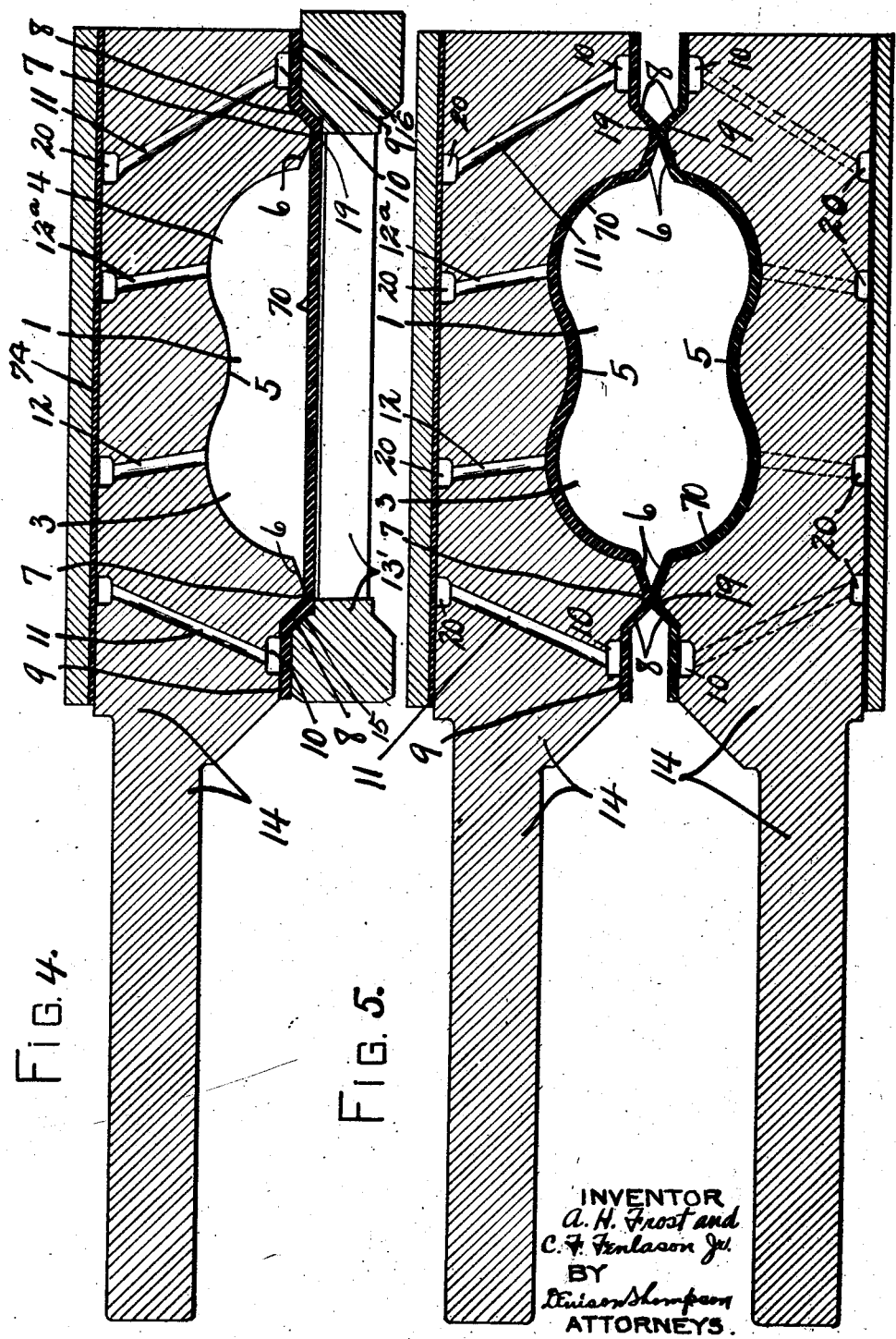

Dec. 22, 1925.  1,566,665
A. H. FROST ET AL
METHOD OF PRODUCING RUBBER ARTICLES
Original Filed Nov. 13, 1922   4 Sheets-Sheet 4
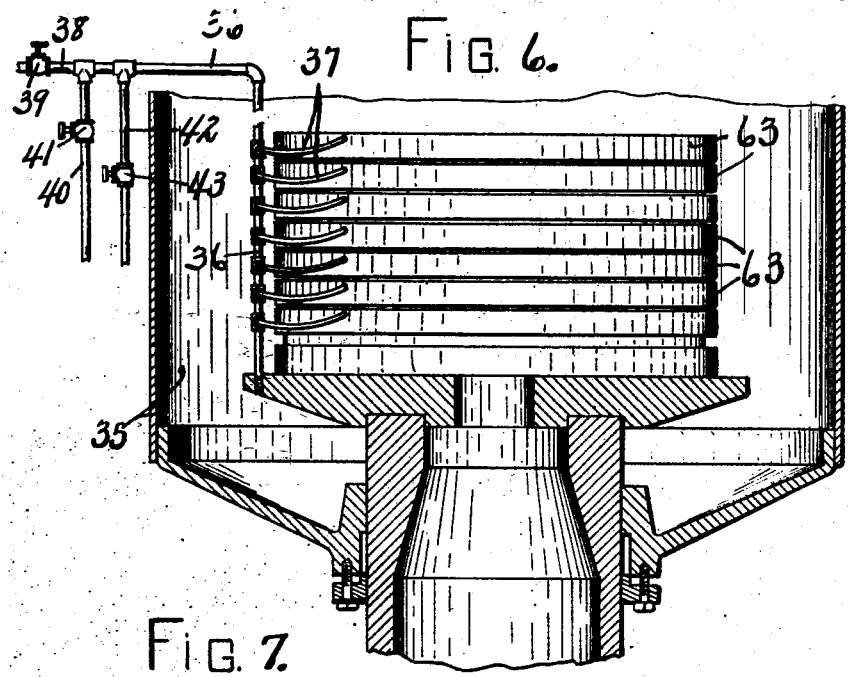
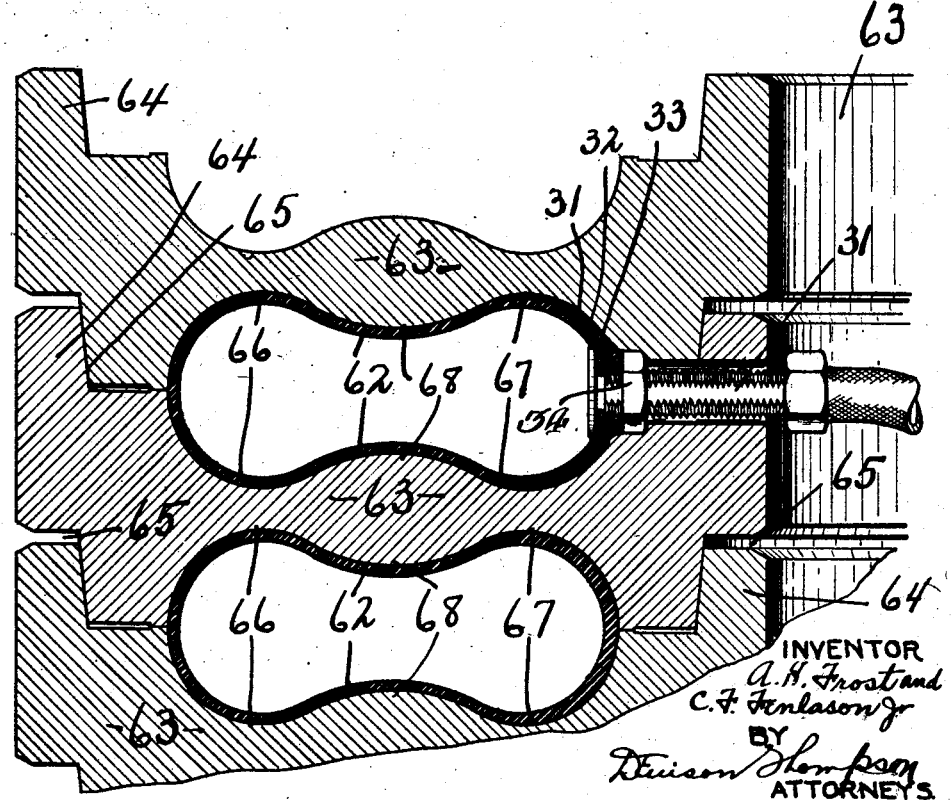
INVENTOR
A. H. Frost and
C. F. Finlason Jr
BY
Denison Thompson
ATTORNEYS Patented Dec. 22, 1925.

1,566,665

UNITED STATES PATENT OFFICE.

ALLEN H. FROST AND CHARLES FRED FENLASON, JR., OF MALONE, NEW YORK.

METHOD OF PRODUCING RUBBER ARTICLES.

Application filed November 13, 1922, Serial No. 600,642. Renewed November 7, 1925.

*To all whom it may concern:*

Be it known that we, ALLEN H. FROST and CHARLES F. FENLASON, Jr., of Malone, in the county of Franklin, in the State of New York, have invented new and useful Improvements in Methods of Producing Rubber Articles, of which the following, taken in connection with the accompanying drawings, is a full, clear, and exact description.

This invention relates to a certain new and novel method and apparatus for manufacturing rubber tubes, and is particularly designed for the production of inner tubes of automobile tires and other vehicle tires.

The main object of the invention is the production of a rubber tube of improved characteristics, including a more uniformly and effectively cured rubber having a longer life, greater tensile strength and increased wearing qualities, such tube being manufactured by a new and improved method effecting economy in cost of production combined with more rapid manufacture.

The invention, briefly speaking, contemplates the production of a rubber tube by the homogeneous incorporation of the opposite edges of two vacuum-stretched mold-shaped annular pieces of rubber. one into the other to form an endless tube of a substantially smooth and unbroken exterior contour, and the vulcanizing of that tube in a manner adapted to produce an article of the most efficient and valuable character.

Other objects and advantages relate to the details of the process, and the specific structure of the apparatus, all as will more fully appear from the following description, taken in connection with the accompanying drawings, in which:—

Figure 2 is a plan view of the operating or inner surface of the mold-section.

Figure 3 is a top plan view of one of the mold-sections.

Figure 4 is a sectional view on line 4—4, Figure 2, illustrating the method of temporarily maintaining the annular rubber sheet in desired position in connection with the mold, so that the vacuum utilized will stretch the rubber into the shape of the mold without movement of the edges of the sheet which results in folds and wrinkles.

Figure 5 is a sectional view illustrating the complementary mold sections in pressing position for homogeneously incorporating the edge portions of two annular sheets, one into the other to form the tube.

Figure 6 is an elevation of a portion of a press in which the vulcanizing operation may be carried out.

Figure 7 is a sectional view through a series of vulcanizing molds, including contained tubes.

Figure 1:
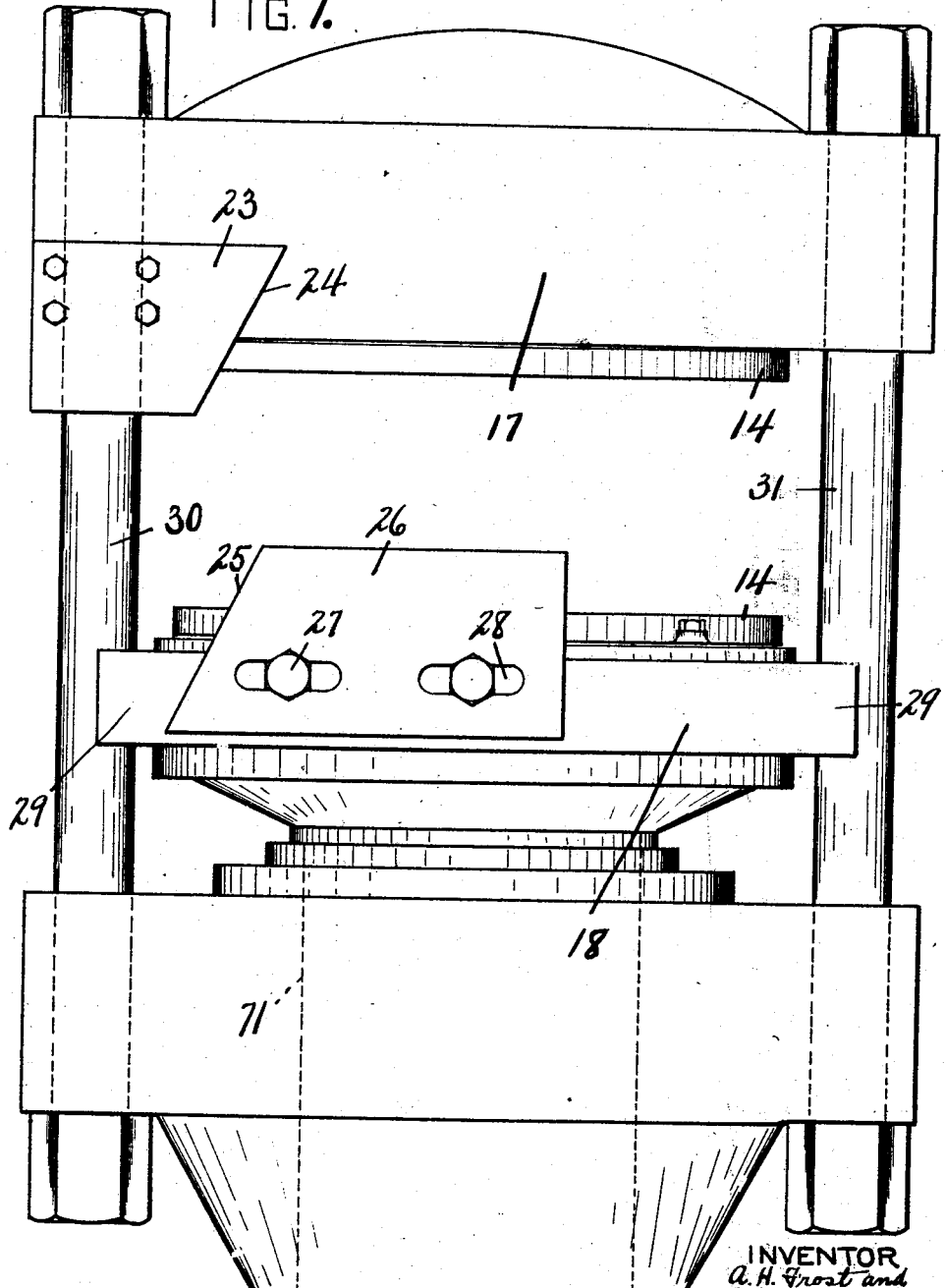
Figure 1 is an elevation of a portion of an ordinary press in connection with which our mold sections are adapted to be assembled for effecting the production of a rubber tube from two annular sheets of rubber.

In this process, as illustrated in the drawings, a tube is formed from two annular or ring-shaped sheets of uncured rubber. This uncured rubber may be of the desired composition and may be produced in any of the well known manners, as by compounding or blending prime washed smoked sheets with chemicals and then, if desired, compounding the rubber so produced with rubber scrap all in a manner well known, in accordance with the desired characteristic of the product.

It will be obvious that altho our process contemplates the utilization of such compound or blended uncured rubber, yet a wide variation in that respect is possible. These annular sheets of rubber are assembled with mold sections of peculiar form and construction, and this is effected in a new and novel manner. A radial section of one of these molds is shown in Figure 4. Each of these mold sections may, as illustrated, be of annular or ring-shaped form, their operating portions being of a circumference and suitably arranged to produce a tube of the desired size.

As illustrated, each mold section has a concavity —1— which in effect constitutes two concavities —3— and —4— by reason of the central rib or undulation —5— which rises in the concavity —1— to produce in effect two annular grooves of curved formation merging into each other along arcuate lines at the curved apex of the rib or undulation —5—. At the inner and outer edges of the concavity —1— the mold section is formed with inclined surfaces —6— terminating in comparatively short substantially horizontal flat surfaces —7—, which flat surfaces —7— form annular cutting edges by reason of the oppositely inclined surfaces —8—, which surfaces lead to flattened portions —9— at the inner and outer peripheries of the mold. There are passageways —11— leading through the mold to the flat surfaces —9— which may be provided with depressions —10— for exposing a considerable surface of the rubber sheet to the vacuum produced by the withdrawal of air through the conduits —11— when the rubber sheet is in place as hereinafter described.

There are other conduits —12— and —12ᵃ— leading to the two annular grooves of the concavity —1— which are adapted for the withdrawal of air therethrough and from the cavity —1— whereby the sheet —70— of rubber, when positioned as shown in Figure 4, and held in position by the clamping frame —13'—, as illustrated in Figure 4, will be drawn into the concavity —1— and shaped to the mold.

In operation, the rubber sheet is placed upon the clamping frame —13'— or upon mold section —14— so that the inclined surfaces —15— of the clamping frame conform with the inclined surfaces —8— of the mold, and the flattened surfaces —16— of the clamping frame conform with the flattened surfaces —9— of the mold, so that when the clamping frame —13'— is pressed against the rubber sheet —70—, its edges will be tightly held in position, as indicated in Figure 4.

Then when the vacuum is applied or the air withdrawn thru the tubes —11— and —12—, the rubber sheet —70— will be drawn into the concavity —1—, and will conform itself to the concavity by its elasticity while the edge portions or peripheries of the sheet may be clamped between the frame —13'— and the inner and outer perimeters of the mold, so that the rubber sheet is conformed to the mold by stretching rather than by mere shaping which latter may involve folds and wrinkling.

The upper and lower mold sections are preferably of the same shape, form and construction and the annular sheets —70— of rubber are applied to these mold sections in the same manner by the utilization of the clamping frame —13'—. These mold sections are preferably supported, as indicated in Figure 1, the one upon the press head —17— and the other upon the press plate —18—. When the rubber sheets have been applied to the mold sections and are being held in proper position with respect to the coacting pressing surfaces of said sections, the press plate may be raised in the usual manner by means of the ram or plunger —71— to bring the mold sections into contact under such high pressure, and in such a manner as to grind, mix and homogeneously unite the edge portions of the sheet of rubber while the cutting edges —19— clip off the portions of the rubber sheet —70— that lie outside the concavity —1— or the portion of the mold constituted by the surfaces —6— and —7—, which surfaces —6— and —7— press together and homogeneously incorporate the edges of one sheet into the other sheet, so that there remains within the mold an endless tube of rubber which may be termed a "biscuit."

The mold sections, as shown, may be provided with annular grooves —20—, in this particular instance, four in number conforming to the conduits thru the molds and through which the vacuum is applied or the air withdrawn from the mold sections. The concentric rows of conduits are in communication with the annular grooves —20—, as illustrated in Figure 3. As shown, a vacuum pipe —21— is connected to the two outer annular grooves, while a vacuum pipe —22— is connected to the two inner annular grooves —20—.

The annular grooves or air channels —20— in the sections —14— may be formed in any suitable manner and as illustrated, are in the form of annular channels covered by a gasket —74— which may be secured in position in any suitable way, as for instance by contact with the mold sections —17— or —18— or by a separate plate, if desired, secured to the mold section —14— in any suitable manner not necessary to herein further describe.

It will, however, be obvious that the air may be withdrawn from the conduits —11—, —12— and —12ᵃ— in any suitable manner, and by other constructions and connections than those shown.

For the purpose of more thoroughly incorporating the edges of one of the rubber sheets in the contacting edge of the other, preferably a slight rotary movement is given one of the mold sections during the pressing operation, and this may be effected as indicated in Figure 1 by forming the press head —17— with a bevel surface which may be constituted by a plate —23— connected to the press head —17—, which plate is formed with an inclined or beveled surface —24— for contact with the surface —25— upon plate —26— secured to the press plate —18— in an adjustable manner, as by bolts —27— extending through slots —28—, as indicated, whereby upon contact of the surface —24— with the surface —25—, and during the upward movement of the press plate, a slight rotary movement of the press plate will be effected, and such rotary movement is permitted by somewhat loose relation between the bearings —29— upon the press plate and the standards —30— and —31— upon which the bearing slides. Only a slight rotary movement is necessary to effect the desired results and the plate —26— may be adjusted to effect that desired movement and the bearings —29— can easily and readily be so formed with respect to the standards —30— and —31— to permit such movement, as indicated. The rubber tube so formed is then removed from the mold and is placed in the vulcanizing molds indicated in Figures 6 and 7. These molds are formed of similar sections, as indicated in Figure 7, which after being assembled, form a space of substantially the same shape as that formed between two of the forming mold-sections —14— so as to be adapted to receive and substantially fit the expanded or partially expanded biscuits of uncured rubber formed by the mold —14—.

Before placing the tube of uncured rubber in the vulcanizing molds, a hole is pierced through the tube for the reception of the valve stem —31—, which is then inserted in such opening, preferably after the usual patches of fabric —31— and —32— have been placed in position, and preferably have been covered with a skin —33— of uncured rubber. The nut —34— may then be placed upon the threaded valve stem to confine the patches and skin —33— with the result that upon vulcanization of the tube, the rubber will tightly conform itself to the nut so as to later assist in the formation of an air-tight joint of unusual strength and rigidity.

The tubes of uncured rubber with the inserted valve stems and with the attached patches, as described, are placed in the vulcanizing molds, and they, as illustrated, are stacked in what is ordinarily termed a French press, within which steam is adapted to circulate about the exterior of the molds for curing the contained tubes.

Our process involves a novel method of effecting an improved cure of the rubber, whereby a tube of greater tensile strength and permanency is produced. For this purpose, in addition to the steam discharge in the chamber of press —35—, a pipe —36— may be extended into the chamber formed with a series of connections —37—, as for instance, flexible conduits which extend into the annular central opening in the mold section, and each of such conduits may be connected to a valve stem —31— to permit the introduction or withdrawal of air, steam, or other fluid into or from the tube with which the particular connection is assembled.

However, in this particular construction and for the purpose of effecting the curing in accordance with our process, pipe —36— is provided with a blow-off or vent pipe —38— controlled by a valve in the casing —39—. There is also connected to the pipe —36— a pipe —40—, such pipe containing a valve within the valve casing —41— for controlling the communication between the air line —40— and the inlet pipe —36—. In addition, there is a second pipe —42— connected to the pipe —36—, which pipe —42— is connected to a source of steam under suitable pressure, and contains a valve in the valve casing —43—, whereby either air under pressure or steam under pressure may be admitted to the tubes within the mold, or said molds may be vented and the air or steam allowed to escape.

Our process is carried out as follows in the actual practice of which various apparatus may be used, that shown being merely illustrative of one method of applying our invention.

Within the chamber of the press —35—, a steam pressure of thirty pounds is maintained for approximately 25 minutes and then a steam pressure of substantially 55 pounds is maintained for 20 minutes. At the same time, and while the biscuit or tube is being subjected to this exterior heat from the steam, I open the valve —41— in the air line and permit air under pressure to pass into the interior of the tubes —62— such air being preferably under a pressure of approximately 90 pounds, and this condition is maintained within the tubes for a period of approximately 25 minutes. At the expiration of that time, the valve in casing —41— is closed and the valve in the casing —39— is opened to permit venting of the tubes —62— by the escape of the air under pressure therefrom. When this escape has been effected, the valve in casing —39— is closed and the valve in casing —43— is opened to permit the entry of steam from pipe —36— into the interior of the tubes —62—. This steam is preferably under a pressure of approximately 75 pounds, and this condition is maintained for approximately four minutes. The valve in casing —43— is then closed and the valve in casing —39— opened to vent the tubes —62— and this venting is continued for approximately one minute, at the expiration of which time the valve in casing —43— is again opened after the valve in casing —39— has been closed, to permit the inflow of steam under approximately the same pressure as before described, and this condition is again maintained for approximately four minutes. This operation of applying steam under pressure to the interior of the tubes —42— and venting the tubes for periods of four minutes and one minute respectively, may be repeated to the end of the cure or vulcanizing operation, which as above described, may last for approximately 45 minutes.

We thus produce a circulation of steam inside the molded rubber article or tube —62— during the vulcanizing operation, and live steam is maintained from time to time in direct contact with the interior surface of the tube, this operation being effected subsequent to the maintenance of a high air pressure within the tubes —62— during the early portion of the process while the tubes are subjected to the exterior heat maintained in the chamber of the press —35—.

This method of vulcanizing rubber articles produces a more uniform cure throughout the stock, required a shorter time for curing whereby production is increased and cost decreased, and produces an article of more permanency and greater tensile strength with increased wearing qualities, due perhaps to an improved bond between the chemicals and the rubber, which in addition, results in a non-blooming stock.

By this process, a tube of improved strength and increased life is produced from two annular sheets of rubber. When the vulcanizing operation is completed, the curing molds may be opened separately by inflating the tubes, as by the introduction of air under pressure through the valve stem —31—.

The vulcanizing molds may, as shown, be formed of similar sections —63— adapted to be piled one upon the other with edge flanges —64— of one fitted into the circumferential recess —65— of another so as to form when assembled a biscuit-receiving recess substantially fitting the formed tube, each mold section having an annular concavity forming the annular grooves —66— and —67— separated by an annular convexity —68— as illustrated. The sections are formed to permit the passage of the valve stem —31—.

Altho we have shown and described a specific process as constituting a perhaps preferred embodiment of my invention, together with special apparatus to be used in carrying out certain process, we do not deside to limit ourselves to the details of the process, or to any particular apparatus, except where the same is specifically included in the claims hereto appended.

We claim:

1. The method of forming annular tubes of rubber comprising uniting the edges of two annular strips of plastic rubber stock by the application of pressure to form an endless tube, then subjecting the tube to the application of external heat, introducing air under pressure into the interior of the tube during such heating, permitting the discharge of such air from the tube, and thereafter alternately admitting steam under pressure to the interior of the tube, and permitting the discharge of steam from the interior of the tube.

2. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, and thereafter curing the tube.

3. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, and then subjecting the mold to the application of external heat.

4. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, then subjecting the mold to the application of external heat, and introducing steam to the interior of the tube.

5. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, then subjecting the mold to the application of external heat, and introducing air under pressure into the interior of the tube.

6. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, then subjecting the mold to the application of external heat, and alternately admitting steam to the interior of the tube and permitting the discharge of steam therefrom.

7. The method of forming annular tubes of rubber, comprising homogeneously uniting the edges of two annular strips of plastic rubber stock by the application of high pressure and simultaneous relative rotary movement, to thereby form an endless tube, then placing the tube in a curing mold, then subjecting the mold to the application of external heat, introducing air under pressure into the interior of the tube for a time period permitting the discharge of such air under pressure from the tube and thereafter alternately admitting steam under pressure to the interior of the tube, and permitting the discharge of steam from the interior of the tube.

8. The method of forming annular tubes of rubber comprising homogeneously uniting the edges of two annular strips of plastic rubber stock by the application of high pressure and simultaneous relative rotary movement, to thereby form an endless tube, then placing the tube in a curing mold, then subjecting the mold to the application of external heat, maintaining an air pressure of approximately 90 pounds within the tube for approximately 25 minutes, then permitting the escape of the air from the tube and introducing steam under pressure of approximately 75 lbs., maintaining the steam pressure within the tube for approximately four minutes, then permitting the discharge of the steam from the tube during a period of about one minute, and thereafter during the vulcanizing period alternately introducing steam under pressure into the tube, and permitting its escape therefrom for approximately the periods of time above stated.

9. The method of forming annular tubes of rubber comprising uniting the edges of two annular strips of plastic rubber stock by the application of pressure to thereby form an endless tube, then subjecting the tube to the application of external heat, maintaining an air pressure of approximately ninety pounds within the tube for approximately twenty-five minutes, then permitting the escape of the air from the tube, and introducing steam under pressure of approximately seventy-five pounds, maintaining the steam pressure within the tube for approximately four minutes, then permitting the discharge of the steam from the tube during a period of about one minute, and thereafter during the vulcanizing period, alternately introducing steam under pressure into the tube and permitting its escape therefrom for approximately the periods of time above stated.

10. The method of forming annular tubes of rubber comprising uniting the edges of two annular strips of plastic rubber stock by the application of high pressure, then subjecting the tube so formed to the application of external heat and during such heating admitting air under pressure to the interior of the tube, and maintaining such pressure for a substantial portion of the vulcanizing period, then discharging the air from the tube and admitting steam under pressure to the tube.

11. The method of forming annular tubes of rubber comprising shaping sheets of rubber stock to an annular mold by stretching portions of the stock between annular edge portions, which annular edge portions are held in stationary position, then homogeneously uniting the annular edges of the two sheets of rubber stock by bringing them together under high pressure and simultaneous relative rotary movement, placing the tube in a curing mold, subjecting the curing mold to the application of external heat, admitting air under pressure to the interior of the tube, and maintaining such pressure, discharging the air from the tube and admitting steam to the tube.

12. The method of forming annular tubes of rubber comprising shaping sheets of rubber stock to an annular mold by stretching portions of the stock between annular edge portions, which annular edge portions are held in stationary position, then homogeneously uniting the annular edges of the two sheets of rubber stock by bringing them together under high pressure and simultaneous relative rotary movement, placing the tube in a curing mold, subjecting the curing mold to the application of external heat, and alternately admitting steam under pressure to the tube and permitting the discharge of the steam from the tube.

13. The method of forming annular tubes of rubber comprising shaping sheets of rubber stock to an annular mold by stretching portions of the stock between annular edge portions, which annular edge portions are held in stationary position, then homogeneously uniting the annular edges of the two sheets of rubber stock by bringing them together under high pressure and simultaneous relative rotary movement, placing the tube in a curing mold, subjecting the curing mold to the application of external heat, admitting air under pressure to the interior of the tube, permitting the discharge of air under pressure from the tube, and alternately introducing steam under pressure into the tube and permitting the discharge of steam from the tube.

14. The method of forming annular tubes of rubber comprising shaping sheets of rubber stock to an annular mold by stretching portions of the stock between annular edge portions, which annular edge portions are held in stationary position, then homogeneously uniting the annular edges of the two sheets of rubber stock by bringing them together under high pressure and simultaneous relative rotary movement, placing the tube in a curing mold, subjecting the curing mold to the application of external heat, admitting air under pressure to the interior of the tube, maintaining such pressure, discharging the air from the tube, admitting steam under pressure to the tube, and permitting the discharge of the steam from the tube and repeating the introduction and exhaust of steam during the remainder of the vulcanizing operation.

15. The method of forming annular tubes of rubber comprising shaping sheets of rubber stock to an annular mold by stretching portions of the stock between annular edge portions, which annular edge portions are held in stationary position, then homogeneously uniting the annular edges of the two sheets of rubber stock by bringing them together under high pressure and simultaneous relative rotary movement, placing the tube in a curing mold, subjecting the curing mold to the application of external heat, maintaining air under pressure of approximately 90 pounds within the article in the mold for approximately 25 minutes, then discharging the air under pressure from the article and admitting steam under pressure of approximately 75 pounds to the article, and maintaining such pressure for approximately four minutes, discharging steam under pressure from the article over a period of approximately one minute and repeating the introduction and exhaust of steam during the remainder of the vulcanizing operation, and covering relative periods of time approximately as above stated.

In witness whereof we have hereunto set our hands this thirty-first day of October, 1922.

ALLEN H. FROST.
CHARLES FRED FENLASON, Jr.